(12) United States Patent
Rapoport

(10) Patent No.: US 9,377,935 B2
(45) Date of Patent: Jun. 28, 2016

(54) SYSTEM AND METHOD FOR PREDICTING PREFERRED DATA REPRESENTATION

(71) Applicant: Uri Rapoport, Moshav Ben Shemen (IL)

(72) Inventor: Uri Rapoport, Moshav Ben Shemen (IL)

(73) Assignee: ASPECT IMAGING LTD., Shoham (IL)

( * ) Notice: Subject to any disclaimer, the term of this patent is extended or adjusted under 35 U.S.C. 154(b) by 67 days.

(21) Appl. No.: 13/945,220

(22) Filed: Jul. 18, 2013

(65) Prior Publication Data

US 2015/0026607 A1    Jan. 22, 2015

(51) Int. Cl.
*G06F 3/00* (2006.01)
*G06F 3/0484* (2013.01)
*G06F 9/44* (2006.01)

(52) U.S. Cl.
CPC ............ *G06F 3/0484* (2013.01); *G06F 9/4443* (2013.01)

(58) Field of Classification Search
CPC ...................................................... G06F 9/4443
USPC .......................................................... 715/762
See application file for complete search history.

(56) References Cited

U.S. PATENT DOCUMENTS

| 8,375,295 | B2 |   | 2/2013  | Zalewski et al. |         |
|-----------|----|---|---------|-----------------|---------|
| 8,924,848 | B2 | * | 12/2014 | Klinger         | 715/235 |
| 8,924,869 | B2 | * | 12/2014 | Fellman         | 715/762 |
| 8,930,831 | B2 | * | 1/2015  | Bartomeli et al.| 715/762 |
| 8,984,426 | B2 | * | 3/2015  | Endoh et al.    | 715/764 |
| 9,003,318 | B2 | * | 4/2015  | Magnusson et al.| 715/769 |

* cited by examiner

*Primary Examiner* — William Titcomb
(74) *Attorney, Agent, or Firm* — Pearl Cohen Zedek Latzer Baratz LLP

(57) ABSTRACT

A system for redesigning a graphical user interface (GUI) including: a computer readable medium (CRM) having instructions; and a screen in communication with the CRM and that displays the GUI. The GUI includes at least one first portion containing first data represented in a first form; and at least one second portion containing second data represented in a second form. The instructions of the CRM direct monitoring interactions between a user and the GUI.

27 Claims, 5 Drawing Sheets

SYSTEM AND METHOD FOR PREDICTING PREFERRED DATA REPRESENTATION

FIELD OF THE INVENTION

The field of the invention relates to designing of a graphical user interface, more specifically, it relates to designing according to user behavior.

BACKGROUND

The layout of a graphical user interface (GUI) is of great importance to any web or software developer. The way we choose to present data on a computer screen, is critical to the way a user engages with our application. A friendly layout may attract more users and increase the user usage of a product. It is therefore critical to learn a user's preference and be able to modify the GUI accordingly.

U.S. Pat. No. 8,375,295 "Customization of GUI layout based on history of use" (refers hereinafter as 295') claim a product that analyses user interaction with different regions of a GUI, and according to the result of the analysis changes the size of different regions. Thereby creating a GUI, which emphasis data that the user is interested in. However, 295' does not relate to changing the way the information is presented on the GUI, it only relates to modifications of sizes of different regions in the GUI.

There is therefore a long unmet need, for a system that will be able to change the visual aspect of data representation in a GUI according to analysis of user preferences.

SUMMARY OF THE INVENTION

It is one object of the present invention to disclose a system for redesigning a graphical user interface (GUI) comprising a computer readable medium (CRM) having instructions thereon; and a screen in communication with the CRM adapted to display a GUI: the GUI comprises (i) at least one first portion containing first data represented in first form; and (ii) at least one second portion containing second data represented in second form; wherein the instructions are for: (i) monitoring interaction between a user and the GUI; and, (ii) performing according to the monitoring, at least one action selected from a group consisting of: changing representation of the first data to the second form, changing representation of the second data to the first form, and a combination thereof.

It is another object of the present invention to disclose the system as described above, wherein either one of the first form, the second form is selected from a group consisting of: text, visual data, icon, picture, design, color, font, size, background, language, dialect, content, phrasing, and a combination thereof.

It is another object of the present invention to disclose the system as described above, wherein the screen is residing on a device selected from a group consisting of: tablet, personal computer, smartphone, mobile device, tablet, and any other electronic device.

It is another object of the present invention to disclose the system as described above, wherein the monitoring includes collecting data over time and analyzing either one of (i) preferred representation of data by the user; and (ii) user behavior.

It is another object of the present invention to disclose the system as described above, wherein the instruction are additionally for rearranging layout of the GUI according to the monitoring.

It is another object of the present invention to disclose the system as described above, wherein the instruction includes a prediction engine configured to compute a probability for an action by the user based on a past pattern of user behavior.

It is another object of the present invention to disclose the system as described above, wherein past behavior of the user is correlated to a type of content displayed on the display.

It is another object of the present invention to disclose the system as described above, wherein instructions includes making the first portion with a first corresponding probability larger than the second portion with a second corresponding probability when the first corresponding probability is greater than the second corresponding probability as resulted by the monitoring.

It is another object of the present invention to disclose the system as described above, wherein the display is a touch screen.

It is another object of the present invention to disclose the system as described above, wherein the instructions are additionally for highlighting a portion that was most recently transformed.

It is another object of the present invention to disclose the system as described above, wherein the interaction is selected from a group consisting of: hovering with curser over the representation in the GUI, clicking the representation in the GUI, touching via a touch screen the representation in the GUI, looking at the representation in the GUI, and a combination thereof.

It is another object of the present invention to disclose the system as described above, additionally comprising elements for the monitoring selected from a group consisting of: an inertial sensor, accelerometer or tilt sensor, an optical sensor, an acoustic sensor, a microphone, a microphone array and a combination thereof.

It is one object of the present invention to disclose a method for redesigning a graphical user interface (GUI) comprising steps of providing a screen in communication with a computer readable medium (CRM) having instructions thereon; displaying a graphical user interface (GUI) on the screen; the GUI comprises (i) at least one first portion containing first data represented in first form; and (ii) at least one second portion containing second data represented in second form; wherein the instructions are for: (i) monitoring interaction between a user and the GUI; and (ii) performing according to the monitoring, at least one action selected from a group consisting of: changing representation of the first data to the second form, changing representation of the second data to the first form, and a combination thereof.

It is another object of the present invention to disclose the method as described above, additionally comprising step of selecting either one of the first form, the second form from a group consisting of: text, visual data, icon, picture, design, color, font, size, background, language, dialect, content, phrasing, and a combination thereof.

It is another object of the present invention to disclose the method as described above, additionally comprising step of residing the screen on a device selected from a group consisting of: tablet, personal computer, smartphone, mobile device, tablet, and any other electronic device.

It is another object of the present invention to disclose the method as described above, additionally comprising step of collecting data over time and analyzing (i) preferred representation of data by the user; and (ii) user behaviour.

It is another object of the present invention to disclose the method as described above, additionally comprising step of rearranging layout of the GUI according to the monitoring.

It is another object of the present invention to disclose the method as described above, additionally comprising step of configuring a prediction engine to compute a probability for an action by the user based on a past pattern of user behavior.

It is another object of the present invention to disclose the method as described above, additionally comprising step of correlating past behavior of the user to a type of content displayed on the display.

It is another object of the present invention to disclose the method as described above, additionally comprising step of making the first portion with a first corresponding probability larger than the second portion with a second corresponding probability when the first corresponding probability is greater than the second corresponding probability as resulted by the monitoring.

It is another object of the present invention to disclose the method as described above, wherein the display is a touch screen.

It is another object of the present invention to disclose the method as described above, additionally comprising step of highlighting a portion that was most recently transformed.

It is another object of the present invention to disclose the method as described above, wherein the interaction is selected from a group consisting of: hovering with curser over the representation in the GUI, clicking the representation in the GUI, touching via a touch screen the representation in the GUI, looking at the representation in the GUI, and a combination thereof.

It is another object of the present invention to disclose the method as described above, additionally comprising elements for the monitoring selected from a group consisting of: an inertial sensor, accelerometer or tilt sensor, an optical sensor, an acoustic sensor, a microphone, a microphone array and a combination thereof.

It is one object of the current invention to disclose an article of manufacture comprising the system as defined above, and any of its dependent claims.

It is another object of the present invention to disclose the article of manufacture as described above, wherein said article of manufacture is a medical device.

It is one object of the current invention to disclose a standard of care protocol for increasing efficiency of medical device operation and reducing human mistakes comprising steps of providing said medical device; and operating said medical device by a graphical user interface (GUI); wherein said GUI is part of the system as defined above, and any of its dependent claims.

A method for detecting favorable area in a graphical user interface comprising steps of: providing a screen in communication with a computer readable medium (CRM) having instructions thereon; displaying a graphical user interface (GUI) on said screen; said GUI comprises a plurality of N sections; said N is an integer larger than one; wherein said instructions are for: (i) monitoring interaction between a user and said GUI; and (ii) giving exposure grade to at least one of said N sections according to said monitoring.

BRIEF DESCRIPTION OF THE DRAWINGS

In order to understand the invention and to see how it may be implemented in practice, a few preferred embodiments will now be described, by way of non-limiting example only, with reference to be accompanying drawings, in which.

Figure 1:
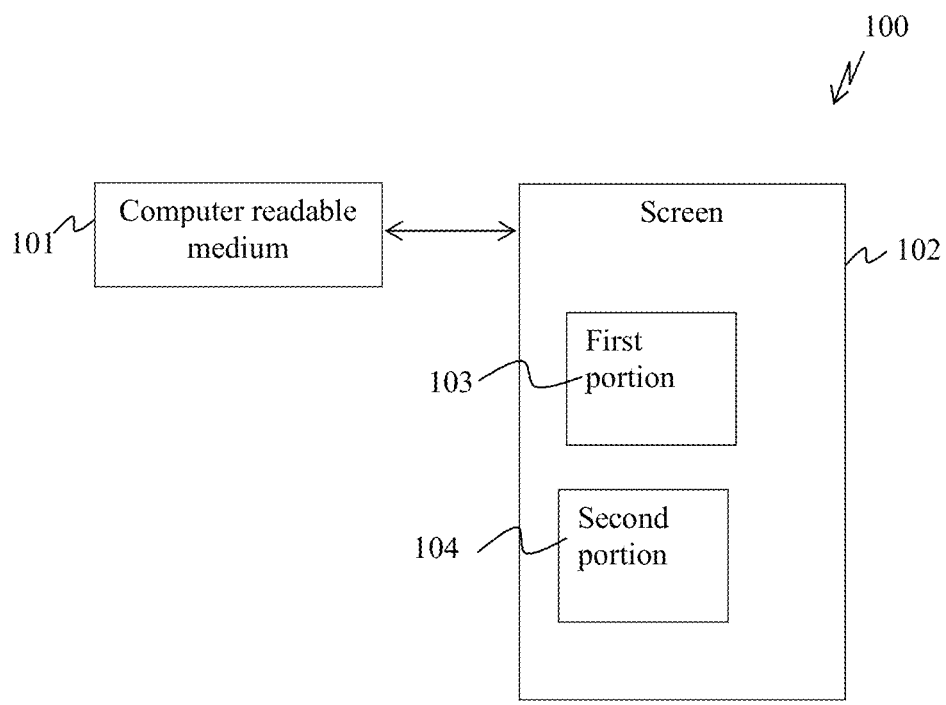
FIG. 1 shows a block diagram of a system for redesigning a graphical user interface.
Figure 2:
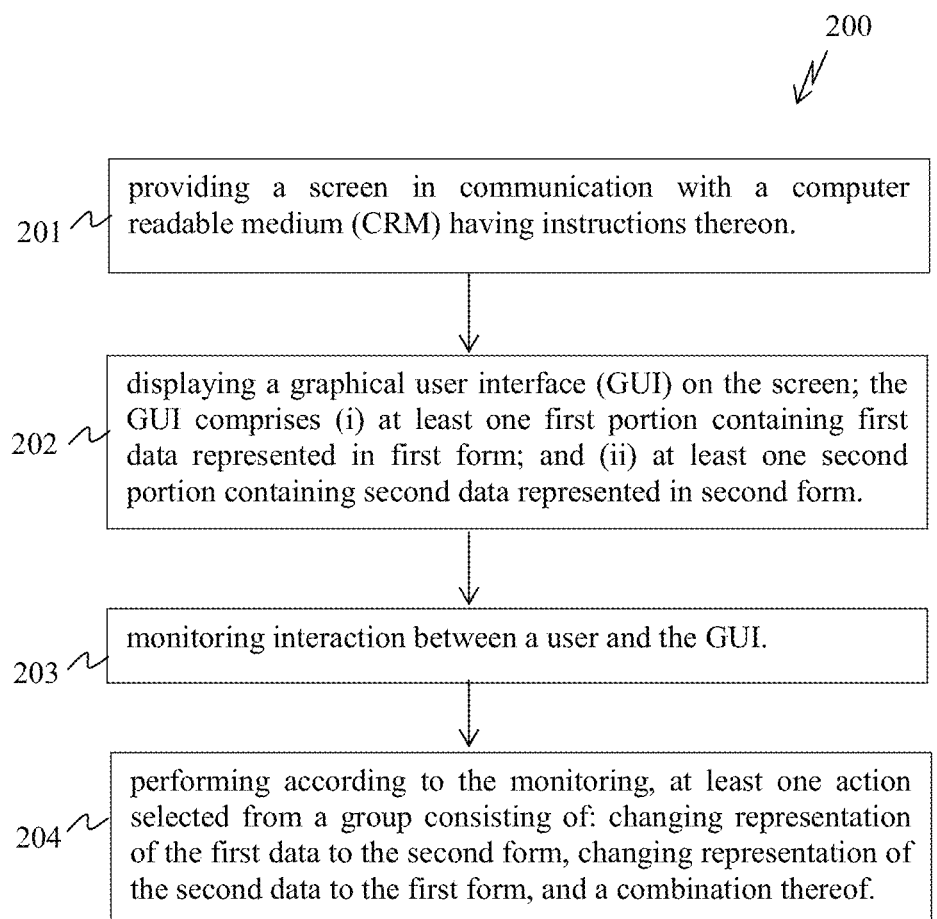
FIG. 2 describes a flowchart for a method for redesigning a graphical user interface.

The word "Skype" incorporated in the above figures is a registered trademark of the company "Microsoft Corporation".

The word "Viber" incorporated in the above figures is a registered trademark of the company "Viber Media, Inc. CORPORATION".

DETAILED DESCRIPTION OF THE INVENTION

The following description is provided so as to enable any person skilled in the art to make use of the invention and sets forth examples contemplated by the inventor of carrying out this invention. Various modifications, however, will remain apparent to those skilled in the art, since the generic principles of the present invention have been defined specifically. Also, it is to be understood that the phraseology and terminology employed herein is for the purpose of description and should not be regarded as limiting.

It is one object of the present invention to disclose a system for redesigning a graphical user interface (GUI) comprising a computer readable medium (CRM) having instructions thereon; and a screen in communication with the CRM adapted to display a GUI: the GUI comprises (i) at least one first portion containing first data represented in first form; and (ii) at least one second portion containing second data represented in second form; wherein the instructions are for: (i) monitoring interaction between a user and the GUI; and (ii) performing according to the monitoring, at least one action selected from a group consisting of: changing representation of the first data to the second form, changing representation of the second data to the first form, and a combination thereof.

It is one object of the present invention to disclose a method for redesigning a graphical user interface (GUI) comprising steps of providing a screen in communication with a computer readable medium (CRM) having instructions thereon; displaying a graphical user interface (GUI) on the screen; the GUI comprises (i) at least one first portion containing first data represented in first form; and (ii) at least one second portion containing second data represented in second form; wherein the instructions are for: (i) monitoring interaction between a user and the GUI; and (ii) performing according to the monitoring, at least one action selected from a group consisting of: changing representation of the first data to the second form, changing representation of the second data to the first form, and a combination thereof.

It is one object of the current invention to disclose a standard of care protocol for increasing efficiency of medical device operation and reducing human mistakes comprising steps of providing said medical device; and operating said medical device by a graphical user interface (GUI); wherein said GUI is part of the system as defined above, and any of its dependent claims.

A method for detecting favorable area in a graphical user interface comprising steps of providing a screen in communication with a computer readable medium (CRM) having instructions thereon; displaying a graphical user interface (GUI) on said screen; said GUI comprises a plurality of N sections; said N is an integer larger than one; wherein said instructions are for: (i) monitoring interaction between a user and said GUI; and (ii) giving exposure grade to at least one of said N sections according to said monitoring.

The term "graphical user interface", refers hereinafter to any user interface which includes either icons or any other visual indicators.

The term "computer readable medium" refers hereinafter to any medium that is capable of storing or encoding a sequence of instructions for execution by a computer and that cause the computer to perform any one of the methodologies of the present invention, it includes, but is not limited to, solid-state memories, optical and magnetic disks, and carrier wave signals.

It is one object of the current invention to disclose a system 100 for redesigning a graphical user interface (GUI) as described in FIG. 1, the system 100 comprising a computer readable medium (CRM) 101 having instructions thereon; and a screen 102 in communication with the CRM 101 adapted to display a GUI: the GUI comprises (i) at least one first portion 103 containing first data represented in first form; and (ii) at least one second portion 104 containing second data represented in second form; wherein the instructions are for: (i) monitoring interaction between a user and the GUI; and (ii) performing according to the monitoring, at least one action selected from a group consisting of: changing representation of the first data to the second form, changing representation of the second data to the first form, and a combination thereof.

In some embodiments of the current invention the system as described above, wherein either one of the first form, the second form is selected from a group consisting of: text, visual data, icon, picture, design, color, font, size, background, language, dialect, content, phrasing, and a combination thereof.

In some embodiments of the current invention the system as described above, wherein the screen is residing on a device selected from a group consisting of: tablet, personal computer, smartphone, mobile device, tablet, and any other electronic device.

In some embodiments of the current invention the system as described above, wherein the monitoring includes collecting data over time and analyzing either one of (i) preferred representation of data by the user; and (ii) user behavior.

In some embodiments of the current invention the system as described above, wherein the instruction are additionally for rearranging layout of the GUI according to the monitoring.

In some embodiments of the current invention the system as described above, wherein the instruction includes a prediction engine configured to compute a probability for an action by the user based on a past pattern of user behavior.

In some embodiments of the current invention the system as described above, wherein past behavior of the user is correlated to a type of content displayed on the display.

In some embodiments of the current invention the system as described above, wherein instructions includes making the first portion with a first corresponding probability larger than the second portion with a second corresponding probability when the first corresponding probability is greater than the second corresponding probability as resulted by the monitoring.

In some embodiments of the current invention the system as described above, wherein the display is a touch screen.

In some embodiments of the current invention the system as described above, wherein the instructions are additionally for highlighting a portion that was most recently transformed.

In some embodiments of the current invention the system as described above, wherein the interaction is selected from a group consisting of: hovering with curser over the representation in the GUI, clicking the representation in the GUI, touching via a touch screen the representation in the GUI, looking at the representation in the GUI, and a combination thereof.

In some embodiments of the current invention, the system as described above, additionally comprising elements for the monitoring selected from a group consisting of: an inertial sensor, accelerometer or tilt sensor, an optical sensor, an acoustic sensor, a microphone, a microphone array and a combination thereof.

It is one object of the present invention to disclose a method 200 for redesigning a graphical user interface (GUI) comprising step 201 of providing a screen in communication with a computer readable medium (CRM) having instructions thereon; step 202 of displaying a graphical user interface (GUI) on the screen; the GUI comprises (i) at least one first portion containing first data represented in first form; and (ii) at least one second portion containing second data represented in second form; wherein the instructions are for: step 203 of monitoring interaction between a user and the GUI; and (ii) step 204 of performing according to the monitoring, at least one action selected from a group consisting of: changing representation of the first data to the second form, changing representation of the second data to the first form, and a combination thereof.

In some embodiments of the current invention, the method as described above, additionally comprising step of selecting either one of the first form, the second form from a group consisting of: text, visual data, icon, picture, design, color, font, size, background, language, dialect, content, phrasing, and a combination thereof.

In some embodiments of the current invention, the method as described above, additionally comprising step of residing the screen on a device selected from a group consisting of: tablet, personal computer, smartphone, mobile device, tablet, and any other electronic device.

In some embodiments of the current invention, the method as described above, additionally comprising step of collecting data over time and analyzing (i) preferred representation of data by the user; and (ii) user behaviour.

In some embodiments of the current invention, the method as described above, additionally comprising step of rearranging layout of the GUI according to the monitoring.

In some embodiments of the current invention, the method as described above, additionally comprising step of configuring a prediction engine to compute a probability for an action by the user based on a past pattern of user behavior.

In some embodiments of the current invention, the method as described above, additionally comprising step of correlating past behavior of the user to a type of content displayed on the display.

In some embodiments of the current invention, the method as described above, additionally comprising step of making the first portion with a first corresponding probability larger than the second portion with a second corresponding probability when the first corresponding probability is greater than the second corresponding probability as resulted by the monitoring.

In some embodiments of the current invention, the method as described above, wherein the display is a touch screen.

In some embodiments of the current invention, the method as described above, additionally comprising step of highlighting a portion that was most recently transformed.

In some embodiments of the current invention, the method as described above, wherein the interaction is selected from a group consisting of: hovering with curser over the representation in the GUI, clicking the representation in the GUI, touching via a touch screen the representation in the GUI, looking at the representation in the GUI, and a combination thereof.

In some embodiments of the current invention, the method as described above, additionally comprising elements for the monitoring selected from a group consisting of: an inertial sensor, accelerometer or tilt sensor, an optical sensor, an acoustic sensor, a microphone, a microphone array and a combination thereof.

It is one object of the current invention to disclose an article of manufacture comprising the system as defined above, and any of its dependent claims.

It is another object of the present invention to disclose the article of manufacture as described above, wherein said article of manufacture is a medical device.

It is one object of the current invention to disclose a standard of care protocol for increasing efficiency of medical device operation and reducing human mistakes comprising steps of providing said medical device; and operating said medical device by a graphical user interface (GUI); wherein said GUI is part of the system as defined above, and any of its dependent claims.

It is another object of the current invention to disclose a method for detecting favorable area in a graphical user interface comprising steps of: providing a screen in communication with a computer readable medium (CRM) having instructions thereon; displaying a graphical user interface (GUI) on said screen; said GUI comprises a plurality of N sections; said N is an integer larger than one; wherein said instructions are for: (i) monitoring interaction between a user and said GUI; and (ii) giving exposure grade to at least one of said N sections according to said monitoring.

Figure 3:
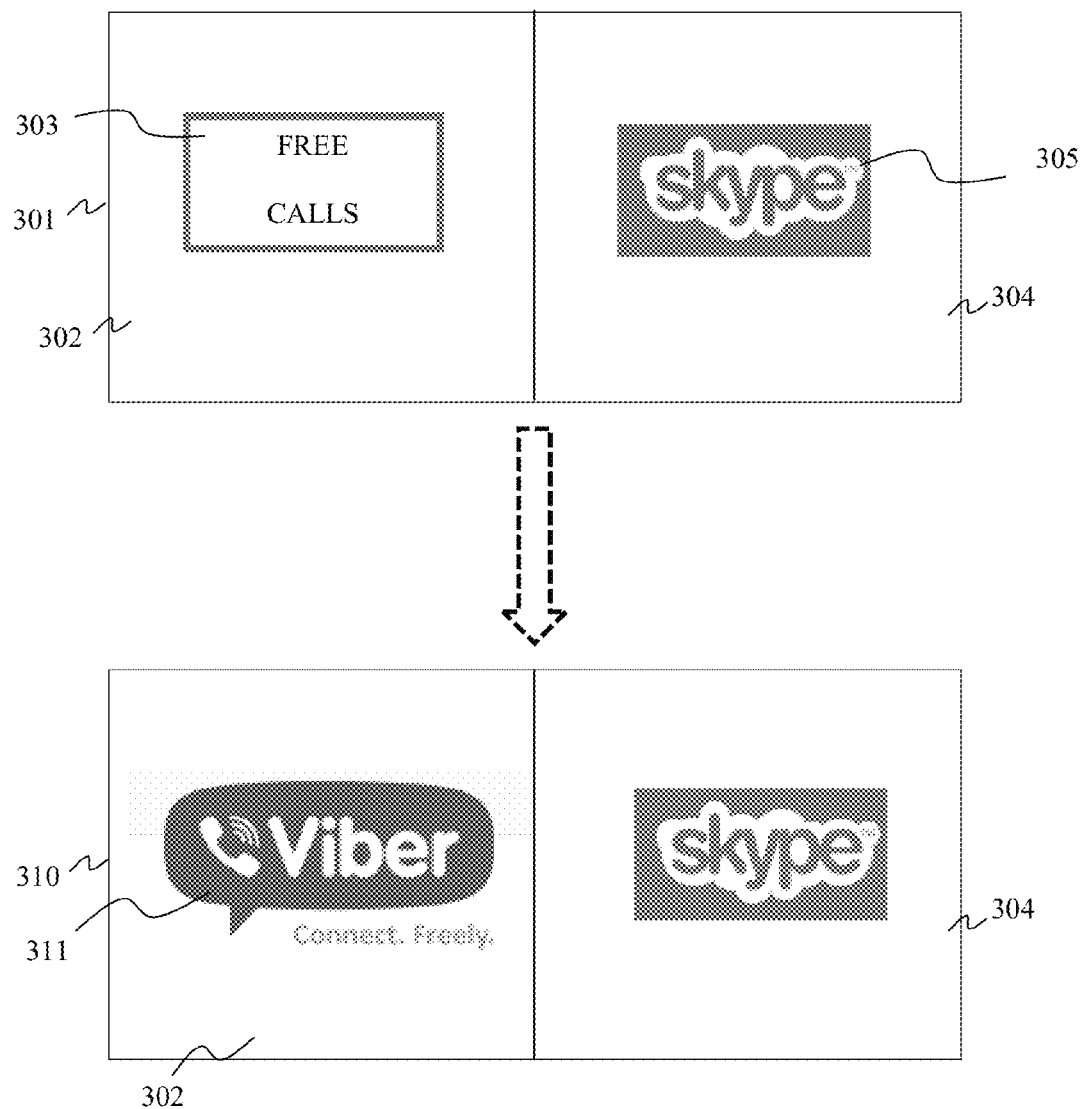
FIG. 3-5 depicts three examples for a graphical user interface transformation.

Reference is now made to FIG. 3 illustrating in a non-limiting a manner one embodiment of a GUI it two different phases. In the first phase 301, the GUI is divided into two sections, the first section 302, shows a text 303 linking to free calls application. The second section 304 shows an image 305 of a free calls application. The user interacts with the GUI, and after interaction, the analysis shows that the user spent more time hovering with the cursor over the image 305. The conclusion is, that the user will more likely to interact with applications displayed as an image than those displayed with text. Therefore, the GUI now transforms into the second phase 310 in which the second section 304 remains the same, and the first section 302 now shows the image 311 leading to the free calls application. This is intended to perhaps increase usage of the user in the free calls application by making it visually accessible.

Figure 4:
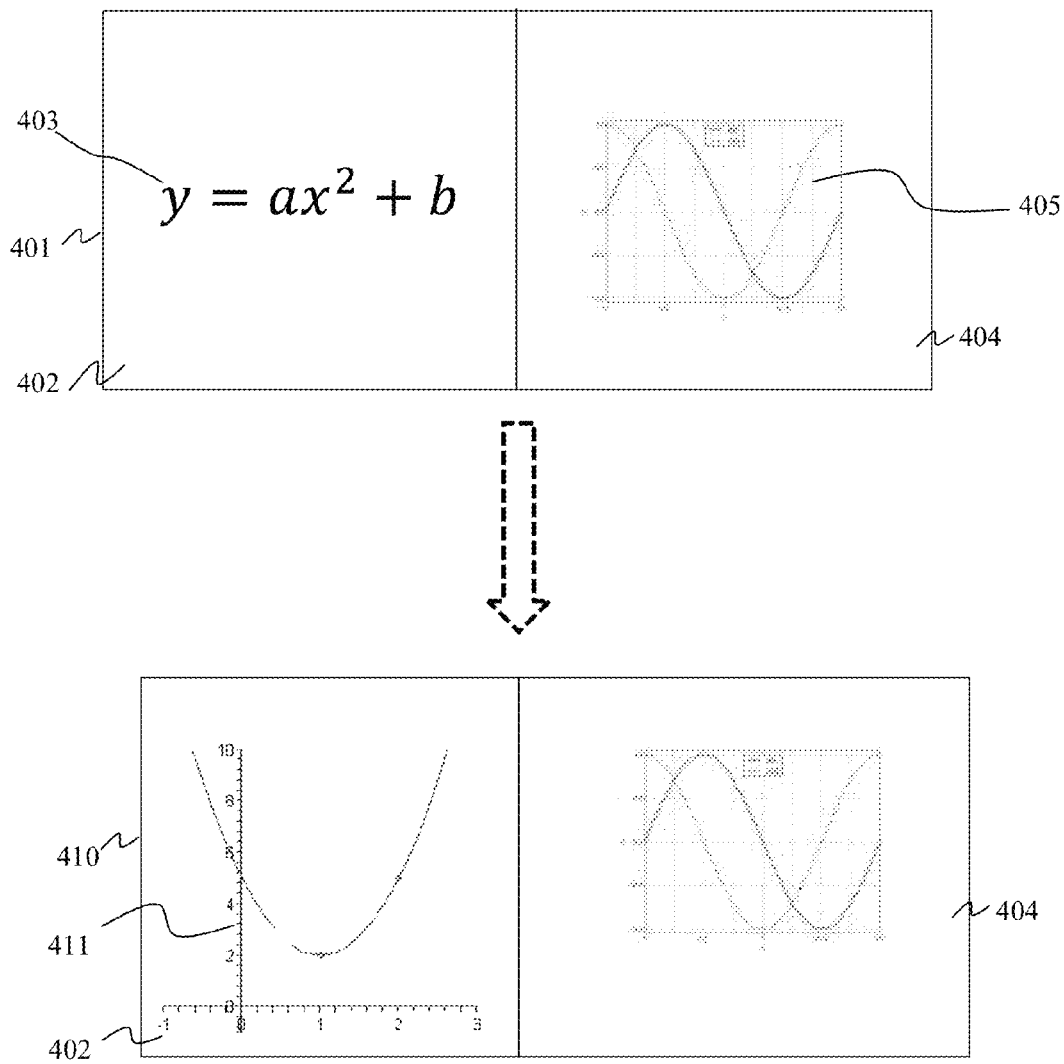

Reference is now made to FIG. 4 illustrating in a non-limiting a manner one embodiment of a GUI it two different phases. In the first phase 401, the GUI is divided into two sections, the first section 402, shows an equation 403 indicating result of an experiment. The second section 404 shows a graph 405 of another experiment. The user interacts with the GUI, and after interaction, the analysis shows that the user spent more time hovering with the cursor over the graph 405. The conclusion is, that the user will more likely to inspect and study the experiment results when they are displayed in a graphical form. Therefore, the GUI now transforms into the second phase 410 in which the second section 404 remains the same, and the first section 402 now shows the graph 411 representing the equation 403. This is intended to perhaps increase interaction between a user or a researcher with experiment results.

Figure 5:
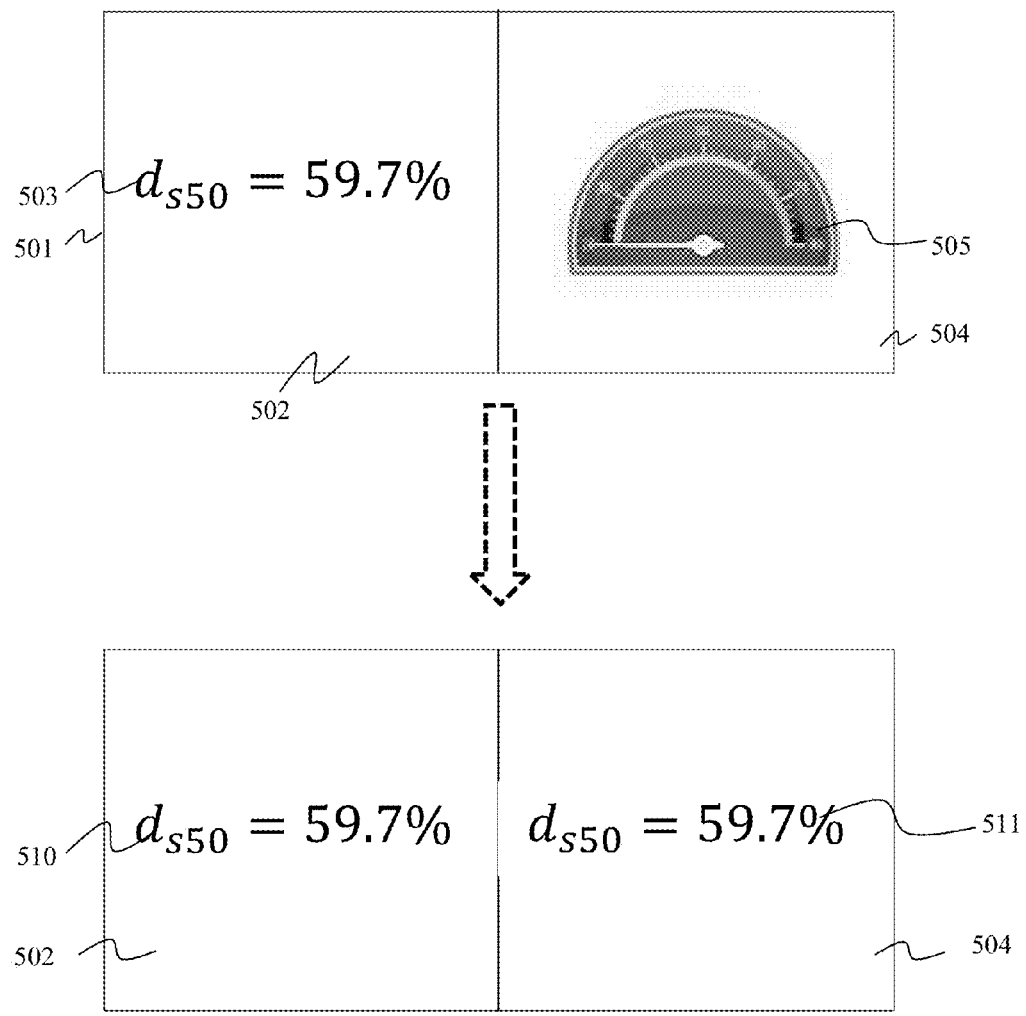

Reference is now made to FIG. 5 illustrating in a non-limiting a manner one embodiment of a GUI it two different phases. In the first phase 501, the GUI is divided into two sections, the first section 502, shows a numerical result 503. The second section 504 shows a scale 505 of another experiment. The user interacts with the GUI, and after interaction, the analysis shows that the user spent more time hovering with the cursor over the numerical representation 503. The conclusion is, that the user will more likely to inspect and study the measurement results when they are displayed in a graphical form. Therefore, the GUI now transforms into the second phase 510 in which the first section 502 remains the same, and the second section 504 now shows the numerical 511 representation of the scale 505. This is intended to perhaps increase interaction between a user or a researcher with measurements.

In one example of the current invention, a user is moving with a cursor along a GUI. A computer that operates the GUI, monitor the movement of the cursor along the GUI. The computer analyzes the movement, and assigns a grade for each section of the GUI. The grade may be set according to the time the user stayed on that specific section.

In some embodiments, the computer monitors the user behavior not with cursor movement but with other sensors attached to the screen or communicating with the computer. Some of these sensors may be a movement sensor, heat sensors, eye movement detector, all aiming toward detection of favorable section in a GUI.

In some embodiments, the preferred sections may be sold at a different price to for advertisement. For example, one user may be looking at the top left part of the screen 80% of the time, therefore, this section will be sold at the highest price for displaying commercials. Another user may spend most of the time with the cursor at the center of the screen, therefore, for this user, a banner presented at the middle of the screen will be sold at the highest price.

The monitoring can be done by using JAVA script, which detects the cursor movement along the screen. In some embodiments, the grade of each section may be presented as a number on the screen, or it may be presented as a "heat map" giving different color to each section of the screen according to its value.

The analysis of the user behavior may be done by a central server or it may be done on the computer readable medium communicating with the screen. After the analysis the data may be sent to a cloud server for further analysis and storing.

The analysis may also be separating different behavior of the user. For example, some of the different behaviors may be:
  Clicking a different section in the GUI.
  Pre-clicking a section but observing it by either looking or by hovering. The hovering may be with a cursor or by using a touch screen. The system may also comprise movement sensor to detect movement in the case there is no touch screen.
  Type of interaction with specific application on the GUI
  Time spent operating the application
  Time spent interacting with the application before operating it etc.

In some embodiments of the current invention, the GUI may change its layout according to the result of analyzing usage of different screen section.

In another embodiment of the current invention, the above mentioned GUI is installed as part of a medical device system. The device is operated by a user interacting with the smart GUI, the GUI changes its appearance according to analysis of user behavior. The change in the GUI appearance is manifested in better performance of operation of medical device, and as a result is reduction of mistakes performed in medical examination.

The GUI may be implemented in a variety of devices, not necessarily in operation of medical examination. It may be installed on any application, which has more than one section, the advantages of using the GUI is primarily by increasing accessibility of information to the users. This is done by understanding visual preferences of the users and implementing them in the system online.

It will be appreciated by persons skilled in the art that embodiment of the invention are not limited by what has been particularly shown and described hereinabove. Rather the scope of at least one embodiment of the invention is defined by the claims below.

The invention claimed is:

1. A system for redesigning a graphical user interface (GUI) comprising:
   a. a non-transitory computer readable storage medium having instructions thereon; and
   b. a screen in communication with said non-transitory computer readable storage medium adapted to display a GUI: said GUI comprises at least one first portion containing first data represented in a first form; and at least one second portion containing second data represented in a second form;
   wherein said instructions are for:
   (i) monitoring interaction between a user and said GUI;
   (ii) analyzing representation preferences of the user according to said monitoring; and
   (iii) changing representation of said first data in said at least one first portion from said first form to said second form or changing representation of said second data in said at least one second portion from said second form to said first form, according to said representation preferences.

2. The system according to claim 1, wherein either one of said first form and said second form is selected from a group consisting of: text, visual data, icon, picture, design, color, font, size, background, language, dialect, content, phrasing, and a combination thereof.

3. The system according to claim 1, wherein said screen is residing on a device selected from a group consisting of: tablet, personal computer, smartphone, mobile device, tablet, and any other electronic device.

4. The system according to claim 1, wherein said monitoring includes collecting data over time and wherein said analyzing representation preferences of the user comprises analyzing the so collected data to find-preferred representation of data by said user.

5. The system according to claim 1, wherein said instructions further include instructions for rearranging layout of said GUI according to said monitoring.

6. The system according to claim 1, wherein said instructions includes a prediction engine configured to compute a probability for an action by said user based on a past pattern of user behavior.

7. The system according to claim 1, wherein past behavior of said user is correlated to a type of content displayed on said display.

8. The system according to claim 6, wherein said prediction engine is further configured to compute probability for said first and second portions and wherein the instructions further include making said first portion with a first corresponding probability larger than said second portion with a second corresponding probability when the first corresponding probability is greater than the second corresponding probability as resulted by said monitoring.

9. The system according to claim 1, wherein said display is a touch screen.

10. The system according to claim 1, wherein said instructions are additionally for highlighting a portion that was most recently transformed.

11. The system according to claim 1, wherein said interaction is selected from a group consisting of: hovering with curser over said representation in said GUI, clicking said representation in said GUI, touching said representation in said GUI if said screen is a touch screen, looking at said representation in said GUI, and a combination thereof.

12. The system according to claim 1, additionally comprising monitoring elements selected from a group consisting of: an inertial sensor, accelerometer or tilt sensor, an optical sensor, an acoustic sensor, a microphone, a microphone array and a combination thereof.

13. A method for redesigning a graphical user interface (GUI) comprising steps of:
   displaying a graphical user interface (GUI) on a screen; said GUI comprises at least one first portion containing first data represented in a first form and at least one second portion containing second data represented in a second form;
   monitoring interaction between a user and said GUI; and
   analyzing representation preferences of the user according to said monitoring; and
   changing representation of said first data in said at least one first portion from said first form to said second form or changing representation of said second data in said at least one second portion from said second form to said first form according to said representation preferences.

14. The method according to claim 13, additionally comprising step of selecting either one of said first form and said second form from a group consisting of: text, visual data, icon, picture, design, color, font, size, background, language, dialect, content, phrasing, and a combination thereof.

15. The method according to claim 13, wherein said screen is residing on a device selected from a group consisting of: tablet, personal computer, smartphone, mobile device, tablet, and any other electronic device.

16. The method according to claim 13, additionally comprising collecting data over time and wherein said step of analyzing comprises analyzing the so collected data to find preferred representation of data by said user.

17. The method according to claim 13, additionally comprising step of rearranging layout of said GUI according to said monitoring.

18. The method according to claim 13, additionally comprising a step of computing a probability for an action by said user based on a past pattern of user behavior.

19. The method according to claim 13, additionally comprising step of correlating past behavior of said user to a type of content displayed on said display.

20. The method according to claim 13, additionally comprising a step of computing probability for said first and second portions and making said first portion with a first corresponding probability larger than said second portion with a second corresponding probability when the first corresponding probability is greater than the second corresponding probability as resulted by said monitoring.

21. The method according to claim 13, wherein said screen is a touch screen.

22. The method according to claim 13, additionally comprising step of highlighting a portion that was most recently transformed.

23. The method according to claim 13, wherein said interaction is selected from a group consisting of: hovering with curser over said representation in said GUI, clicking said representation in said GUI, touching said representation in said GUI if said screen is a touch screen, looking at said representation in said GUI, and a combination thereof.

24. The method according to claim 13, wherein said monitoring is performed by means of an element selected from the group consisting of: an inertial sensor, accelerometer or tilt sensor, an optical sensor, an acoustic sensor, a microphone, a microphone array and a combination thereof.

25. An device comprising the system as defined in claim 1, wherein said device is operated by a user interacting with said GUI.

26. The device according to claim 25, wherein said device is a medical device.

27. A standard of care protocol for increasing efficiency of medical device operation and reducing human mistakes comprising steps of:
 a. providing said medical device; and
 b. operating said medical device by a graphical user interface (GUI);
 wherein said GUI is part of the system as defined in claim 1.

\* \* \* \* \*